United States Patent [19]
Dumesnil

[11] 3,829,823
[45] Aug. 13, 1974

[54] COLLAR FOR AUTOMOBILE VEHICLE BATTERY

[76] Inventor: Gerard Paul Louis Dumesnil, 17 Rue Saint Marc, Epinay, France

[22] Filed: May 22, 1972

[21] Appl. No.: 255,589

[52] U.S. Cl. .............................. 339/228, 339/45 R
[51] Int. Cl. ............................................. H01r 11/22
[58] Field of Search .......................... 339/224–240, 339/45

[56] References Cited
UNITED STATES PATENTS
1,808,648  6/1931  Fisher ................................ 339/225
3,457,542  7/1969  Wolf .............................. 339/268 R FOREIGN PATENTS OR APPLICATIONS
713,800  8/1954  Great Britain ...................... 339/232
867,437  5/1961  Great Britain ...................... 339/232

*Primary Examiner*—Richard E. Moore
*Attorney, Agent, or Firm*—Brown, Murray, Flick & Peckham

[57] ABSTRACT

Collar for battery of automobile vehicles comprising an insulating hood in the form of a hollow boss surrounded at its base by an annular flange with a raised edge, the boss being fitted onto the terminal of the battery and comprising a hole revealing a portion of the terminal on which is applied the bared end of a cable by means of an elastic member partially surrounding the boss, and a cap insulating the assembly.

8 Claims, 4 Drawing Figures

3,829,823

COLLAR FOR AUTOMOBILE VEHICLE BATTERY

The invention relates to a collar for batteries of motor vehicles and acting as a perfect insulator and able, in case of impact, to act as a circuit breaker.

The collars normally used on the terminal posts of batteries are generally made of expensive materials; brass, bronze, lead, and are subject to rapid corrosion because of acids rising up along the terminals of the batteries. In addition, securing them is not a rapid operation and the organs used for securing them (screw bolts) require tightening which is a dangerous procedure since, not being insulated, they transmit the current from the battery to the spanners used for tightening, thereby causing short circuits frequently during the tightening process.

It is also noted, in regard to the known collars, that there is a complete lack of insulation with them and their weight is heavy, thereby increasing costs.

The object of the invention is to overcome these disadvantages and therefore relates to a collar for batteries of automobile vehicles, comprising an insulating hood fixed on one of the terminals of the battery, the hood comprising at least one hole revealing a portion of the terminal concerned, against which the bared end of the cable is maintained by means of an elastic member.

Another object of the invention is to construct a collar in which the bared end of the cable is maintained on the terminal of the battery by means of a plate-spring.

Yet another object of the invention is to construct a collar in which the hood consists of a hollow boss, truncated in shape, extended laterally at the base by an annular flange in the shape of a gutter, the boss comprising on one hand, a hole which extends over the major part of its height and, on the other, a swelling diametrically opposite this hole.

A collar according to the invention is illustrated by way of a non-limitative example in the accompanying figures in which:

FIG. 2 is a perspective view of the collar with the cap on;

One of the essential objects of the invention is the manufacture of a collar for batteries, able to overcome the observed disadvantages of the known collars and, more particularly, to enable a simple and rapid connection to be made between the electric conductor and the terminal of the battery, this collar being able, in addition, to serve as a circuit breaker in case of shock, such as caused by impact of the automobile with another vehicle or other object.

Figure 1:
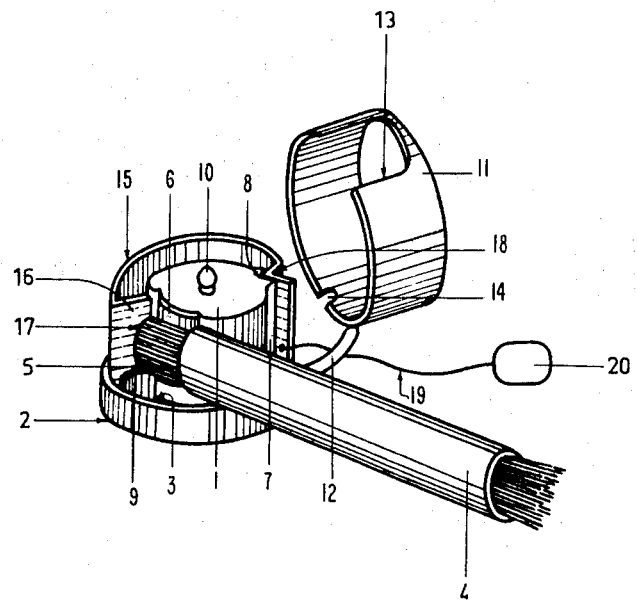
FIG. 1 is a perspective view of the collar, of which the cap is open.

According to the mode of construction as shown in FIG. 1, the collar consists of an insulating hood made of a material which is proof against corrosive products having a tendency to rise up along the terminal post of a battery, for example a material such as polyethylene or polypropylene, the hood consisting of a hollow boss 1 of a slightly truncated shape fitting the conical shape of the terminal concerned, the boss being extended at its base laterally, and entirely around it, by an annular flange 2 of which the outer edge is turned up at 90° forming a gutter which serves to stop the ascent of corrosive products coming from the battery, this gutter 3 preferably containing an anti-corrosive product intended to protect the cable or conductor 4 and, more particularly, its bared extremity 5.

The boss 1 is provided in one side with window or hole 6 for revealing a portion of the terminal post P onto which will be forced the said boss.

In this respect, it should be noted that the inner diameter of the hollow boss 1 is slightly smaller than the outer diameter of the terminal concerned, so that there is an intimate contact between the two parts.

The boss comprises, in addition, a swelling 7, diametrically opposite the hole 6, the swelling being provided with a groove 8 extending along the entire height of the boss. Finally, the boss also comprises, as part of the same piece at flange 2, two reinforced projections or supports 9 located beside the hole 6, as well as a knob 10 enabling the protective cap 11 connected to the flange 2 of the hood by means of a flexible member 12 to be locked in place. This cap 11 is provided with, as shown in FIG. 1, a notch 13 for the passage of an electric conductor 4, as well as a notch 14 serving for the passage of the flexible member 19 connecting the weight 20 to the spring 15.

When the hood is fitted correctly onto the terminal concerned, the operator places the bared end 5 of the conductor tangentially to the hood at the hole 6 in a manner such that the maximum number of strands of said conductor enters into contact with the visible portion of the terminal concerned.

The conductor is then maintained in position by an elastic member, for example a plate-spring 15 curved part way around the hood and of which one of the ends 16, bent inwardly at right angles, has a semi-circular cut-out portion 17 which is shaped to conform to the shape of part of the periphery of the bared end of the conductor. The other end 18 of the spring is shaped like a hook so as to engage, by reason of simple elasticity, in the groove 8 extending over the entire height of the swelling 7 of the boss 1. This locking of the spring is effected by the progressive rise of the end in the shape of a hook 18 along the swelling 7 of the boss of the hood; this rise being progressive and the angle of rotation large, the effort required to effect this locking is small given a vigorous tightening against the spring of the cable.

Figure 2:
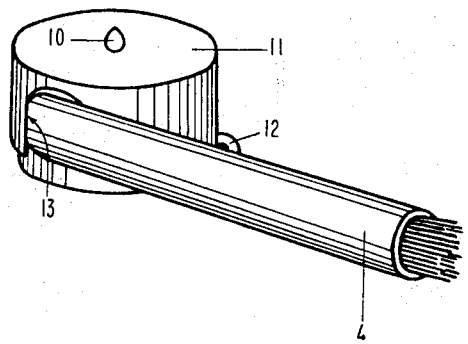
Figure 3:
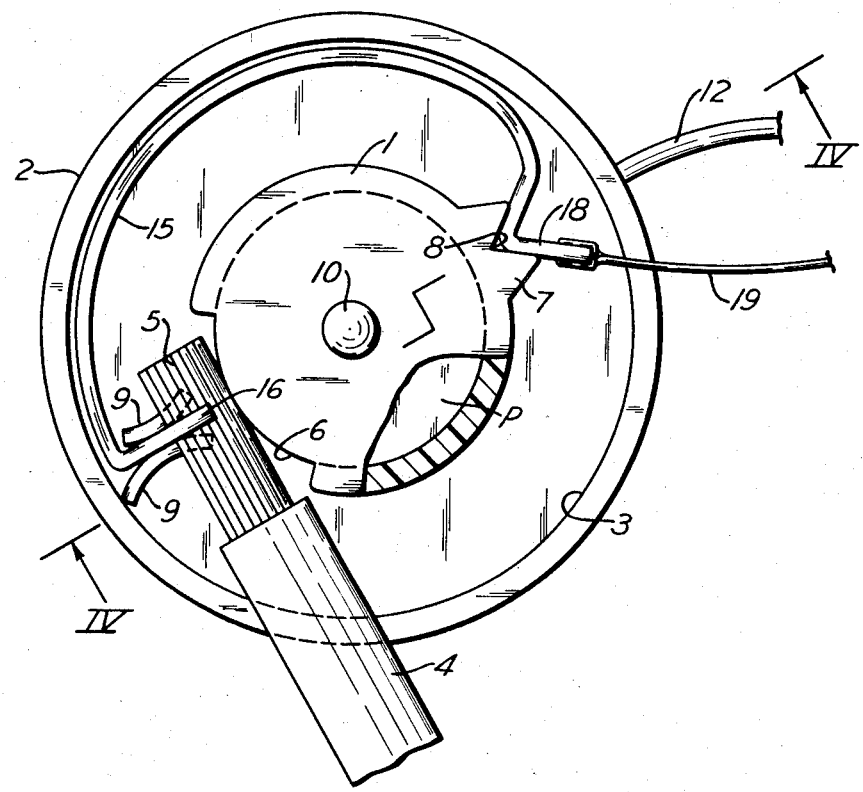
FIG. 3 is an enlarged plan view of the collar with the cap removed.
Figure 4:
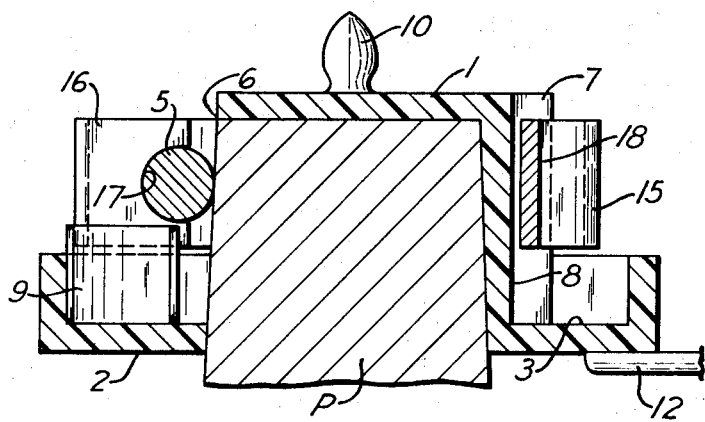
FIG. 4 is a vertical section taken on the line IV—IV of FIG. 3.

When the spring is thus locked, the conductor is applied firmly to the visible portion of the terminal and an electrical connection between the terminal and the conductor made. It is then sufficient for the operator to cover the assembly with the cap 11 which, as shown in FIG. 2, insulates the assembly of the collar. This collar enables not only a rapid connection to be made between the terminal and the electric conductor but, in addition, to be used as a circuit breaker in case of shock. It suffices, in this regard, to connect by means of the member 19 the end 18 of the spring to the free weight 20 which, in case of shock, will unlock, by simple inertia, the spring holding the cable against the terminal, thereby causing an immediate interruption of the electric current flow between the terminal and the conductor. The unlocking is caused by the rapidly moving weight jerking hook 18 out of groove 8.

The battery collar has the advantage not only of being proof against the corrosive action of the battery, and in case of shock ensuring protection against fire, but also of being unaffected by the pulls exerted on the cable, as these pulls, transmitted to the spring, tend to make it turn, which is made impossible by the two parallel supports 9 between which is introduced the bottom of the folded end 16 of the plate-spring 15.

It is obvious that this spring can be bare, surface treated, for example by a cadmium process, insulated or coated with a plastic to enable the terminal of the battery to be insulated completely.

It is obvious that the invention is not limited to the application herein above described and illustrated and that on the basis of it other variants can be envisaged within the scope of the invention.

What I claim is:

1. A collar for an automobile battery terminal post, comprising an insulating hood adapted to fit over a battery terminal post and provided at one side with an opening to expose a portion of the side of the post, the opposite side of the hood having a substantially vertical groove therein, and a laterally curved plate spring extending part way around the hood and having one end turned inwardly toward said opening to enable it to engage the side of a metal cable between it and said opening, and the opposite end portion of the spring being turned inwardly into said groove to lock the spring in place with its first-mentioned inturned end pressing a cable against the post.

2. A collar according to claim 1, in which said groove is diametrically opposite said opening.

3. A collar according to claim 1, including an insulating cap covering said hood and spring.

4. A collar according to claim 1, in which the bottom of said hood has an outwardly extending annular flange with an upturned outer edge.

5. A collar according to claim 4, including a pair of projections on the hood straddling the lower end of said first-mentioned inturned end of the spring.

6. A collar according to claim 1, in which said groove is diametrically opposite said opening, the bottom of the hood has an outwardly extending solid annular flange with an upturned outer edge, and said spring is above said flange, said collar including an insulating cap covering said hood and spring.

7. A collar according to claim 6, including a free weight, and a flexible line connecting the weight with the end of said spring beside said groove, whereby if an impact causes the weight to move rapidly relative to the hood and jerk the spring out of said groove the spring will release the cable.

8. A collar according to claim 1, including a free weight connected with the end of said spring beside said groove, whereby if an impact causes the weight to move rapidly relative to the hood and jerk the spring out of said groove the spring will release the cable.

* * * * *